United States Patent
Mizuguchi

(10) Patent No.: US 9,671,290 B2
(45) Date of Patent: Jun. 6, 2017

(54) TEMPERATURE MEASUREMENT METHOD FOR ULTRAVIOLET LIGHT TRANSMITTANCE MEMBER, TEMPERATURE MEASUREMENT DEVICE FOR ULTRAVIOLET LIGHT TRANSMITTANCE MEMBER, AND LIGHT SOURCE DEVICE

(71) Applicant: NIKON CORPORATION, Tokyo (JP)

(72) Inventor: Masafumi Mizuguchi, Yokohama (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 15/191,871

(22) Filed: Jun. 24, 2016

(65) Prior Publication Data

US 2016/0305822 A1  Oct. 20, 2016

Related U.S. Application Data

(63) Continuation of application No. PCT/JP2014/084538, filed on Dec. 26, 2014.

(30) Foreign Application Priority Data

Dec. 27, 2013  (JP) .................................. 2013-271308

(51) Int. Cl.
*G01J 5/10*  (2006.01)
*G01J 5/00*  (2006.01)
*G01K 11/12*  (2006.01)

(52) U.S. Cl.
CPC .............. *G01J 5/0003* (2013.01); *G01J 5/10* (2013.01); *G01K 11/12* (2013.01)

(58) Field of Classification Search
CPC ........... G01J 5/0003; G01J 5/10; G01K 11/12
(Continued)

(56) References Cited

U.S. PATENT DOCUMENTS 4,974,182 A * 11/1990 Tank ....................... G01J 5/601
                                                    250/339.01
5,683,179 A * 11/1997 Lowry .................. G01K 11/20
                                                    374/161

(Continued)

FOREIGN PATENT DOCUMENTS

JP   2005-275095   10/2005
JP   2009-163965   7/2009

(Continued)

OTHER PUBLICATIONS

International Written Opinion of the International Searching Authority dated Feb. 3, 2015 in corresponding International Patent Application No. PCT/JP2014/084538.

(Continued)

*Primary Examiner* — Andrew Coughlin

(57) ABSTRACT

There is provided a temperature measurement method for measuring a temperature of an ultraviolet light transmittance member transmitting ultraviolet light. The method includes: detecting ultraviolet light transmitted through the ultraviolet light transmittance member using a spectroscopic measurement unit, and obtaining an absorption edge wavelength of the ultraviolet light transmittance member; and deriving a temperature of the ultraviolet light transmittance member on the basis of the obtained absorption edge wavelength.

14 Claims, 10 Drawing Sheets

(58) Field of Classification Search
USPC .................................... 374/162, 130, 161
See application file for complete search history.

(56) References Cited

U.S. PATENT DOCUMENTS

| | | | |
|---|---|---|---|
| 7,686,505 B2* | 3/2010 | Meltzer | G01J 1/4257 374/121 |
| 7,980,758 B2* | 7/2011 | SempriMoschnig | G01K 13/00 374/121 |
| 2005/0105585 A1* | 5/2005 | Liu | G01J 5/60 374/130 |
| 2013/0215618 A1 | 8/2013 | Matsuura | |

FOREIGN PATENT DOCUMENTS

| | | |
|---|---|---|
| JP | 2009-532829 | 9/2009 |
| JP | 2012-79584 | 4/2012 |
| WO | WO 2007/120521 A2 | 10/2007 |

OTHER PUBLICATIONS

International Search Report mailed Feb. 3, 2015, in corresponding International Application No. PCT/JP2014/084538.

* cited by examiner

TEMPERATURE MEASUREMENT METHOD
FOR ULTRAVIOLET LIGHT
TRANSMITTANCE MEMBER,
TEMPERATURE MEASUREMENT DEVICE
FOR ULTRAVIOLET LIGHT
TRANSMITTANCE MEMBER, AND LIGHT
SOURCE DEVICE

CROSS-REFERENCE TO RELATED APPLICATIONS

This application is a Continuation application of International Application No. PCT/JP2014/084538, filed Dec. 26, 2014, claiming the conventional priority of Japanese patent Application No. 2013-271308 filed on Dec. 27, 2013 and titled "Temperature Measurement Method for Ultraviolet Transmittance Member, Temperature Measurement Device for Ultraviolet Transmittance Member, and Light Source Device". The disclosures of Japanese patent Application No. 2013-271308 and International Application No. PCT/JP2014/084538 are incorporated herein by reference in their entirety.

BACKGROUND

The present disclosure relates to a temperature measurement method for measuring the temperature of an ultraviolet light transmittance member transmitting ultraviolet light, a temperature measurement device for an ultraviolet light transmittance member, and a light source device.

Use has increased for vacuum ultraviolet (VUV) light having a wavelength of 200 nm or less as: light sources of semiconductor exposure devices and liquid crystal exposure devices, and light sources of inspection apparatuses for masks used in these exposure devices and various substrates fabricated by these exposure devices. For example, a semiconductor exposure device utilizing an ArF excimer laser having an oscillation wavelength of 193 nm as a light source is already in practical use; and furthermore, research into a light source device that produces VUV light having the same 157 nm wavelength as an $F_2$ laser and research into a light source device using a deuterium lamp having a high-intensity peak near the 160 nm wavelength is being earnestly pursued (e.g. see Japanese Unexamined Patent Application Publication No. 2005-275095A).

Calcium fluoride ($CaF_2$: fluorite), magnesium fluoride ($MgF_2$), crystal ($SiO_2$), quartz ($SiO_2$), and the like are known as materials that transmit ultraviolet light that has a wavelength in the region of 200 nm or less; and containers of lamps, windows, and other ultraviolet light transmittance members are manufactured using these materials (e.g. see Japanese Unexamined Patent Application Publication No. 2009-163965A, Japanese Unexamined Patent Application Publication No. 2009-532829A, and Japanese Unexamined Patent Application Publication No. 2012-79584A).

SUMMARY

When an ultraviolet light transmittance member is used as the container of a lamp, high-pressure gas is encapsulated in the container. Due to electrical discharge between electrodes or laser irradiation and the like being applied to the gas in order to generate plasma and induce light emission, the temperature of the ultraviolet light transmittance member readily rises to high temperatures. However, when the temperature of an ultraviolet light transmittance member rises to high temperatures, typically mechanical strength declines. Particularly, when the temperature of calcium fluoride ($CaF_2$) becomes about 210° C., slip begins to occur at the crystal interface, and at even higher temperatures, the mechanical strength thereof declines significantly. In order to prevent problems of damage and the like caused by decreases in mechanical strength, the temperature of the ultraviolet light transmittance member must first be detected.

One technique for non-contact measuring the temperature of a member is a temperature measurement device known as thermovision or thermography in which the radiation energy of infrared light emitted from a subject is detected and visualized. However, the temperature of the ultraviolet light transmittance member itself cannot be measured by thermovision or the like because all of the materials mentioned above, including the calcium fluoride, have high transmittance throughout a wide range from the vacuum ultraviolet region to the infrared region, and are transparent even in the infrared region. Contact temperature measurement using a thermocouple or the like is not preferable because the fixing member by which the thermocouple or the like is fixed to the ultraviolet light transmittance member will block the exiting of light from the plasma out of the ultraviolet light transmittance member and, in cases when plasma is generated by laser excitation, will block the entering of laser light into the ultraviolet light transmittance member.

In light of the forgoing, an object of the present disclosure is to provide a temperature measurement method, a temperature measurement device, and a light source device whereby the temperature of an ultraviolet light transmittance member can be accurately measured by concise means.

A first aspect exemplifying the present disclosure is a temperature measurement method for measuring a temperature of an ultraviolet light transmittance member transmitting ultraviolet light. The method includes: detecting ultraviolet light transmitted through the ultraviolet light transmittance member using a spectroscopic measurement unit, and obtaining an absorption edge wavelength of the ultraviolet light transmittance member; and deriving a temperature of the ultraviolet light transmittance member on the basis of the obtained absorption edge wavelength.

A second aspect exemplifying the present disclosure is a temperature measurement device for an ultraviolet light transmittance member, the device being configured to measure a temperature of the ultraviolet light transmittance member transmitting ultraviolet light. The device includes: a spectroscopic measurement unit which detects an intensity distribution of a wavelength region including an absorption edge wavelength of the ultraviolet light transmittance member, in ultraviolet light transmitted through the ultraviolet light transmittance member; and a calculation processing unit which obtains the absorption edge wavelength of the ultraviolet light transmittance member from the intensity distribution of the ultraviolet light detected by the spectroscopic measurement unit, and which derives a temperature of the ultraviolet light transmittance member on the basis of the obtained absorption edge wavelength.

A third aspect exemplifying the present disclosure is a light source device including: a light source unit which generates ultraviolet light; an ultraviolet light transmittance member that transmits the ultraviolet light generated by the light source unit; a spectroscopic measurement unit which detects an intensity of light which is included in the ultraviolet light and which has an absorption edge wavelength of the ultraviolet light transmittance member, the absorption edge wavelength being an absorption edge wavelength in a case that the ultraviolet light transmittance member through which the ultraviolet light has passed becomes equal to a reference temperature; and an alarm control unit which performs alarm operations in a case that the intensity of the light detected by the spectroscopic measurement unit becomes less than or equal to a preset reference value.

A fourth aspect exemplifying the present disclosure is a temperature measurement device for an ultraviolet light transmittance member, the device being configured to measure a temperature of the ultraviolet light transmittance member transmitting a first ultraviolet light. The device includes: a light source unit which generates a second ultraviolet light; a spectroscopic measurement unit which detects an intensity distribution of a wavelength region including an absorption edge wavelength of the ultraviolet light transmittance member, in the second ultraviolet light generated by the light source unit and transmitted through the ultraviolet light transmittance member; and a calculation processing unit which obtains the absorption edge wavelength of the ultraviolet light transmittance member from the intensity distribution of the second ultraviolet light detected by the spectroscopic measurement unit, and which derives a temperature of the ultraviolet light transmittance member on the basis of the obtained absorption edge wavelength.

BRIEF DESCRIPTION OF DRAWINGS

FIG. 9A depicts an emission spectrum of ultraviolet light near the light source. FIG. 9B depicts intensity characteristics of a difference between the emission spectrum of the ultraviolet light near the light source and the spectral intensity distribution of ultraviolet light transmitted through the ultraviolet light transmittance member.

EMBODIMENTS

Figure 1:
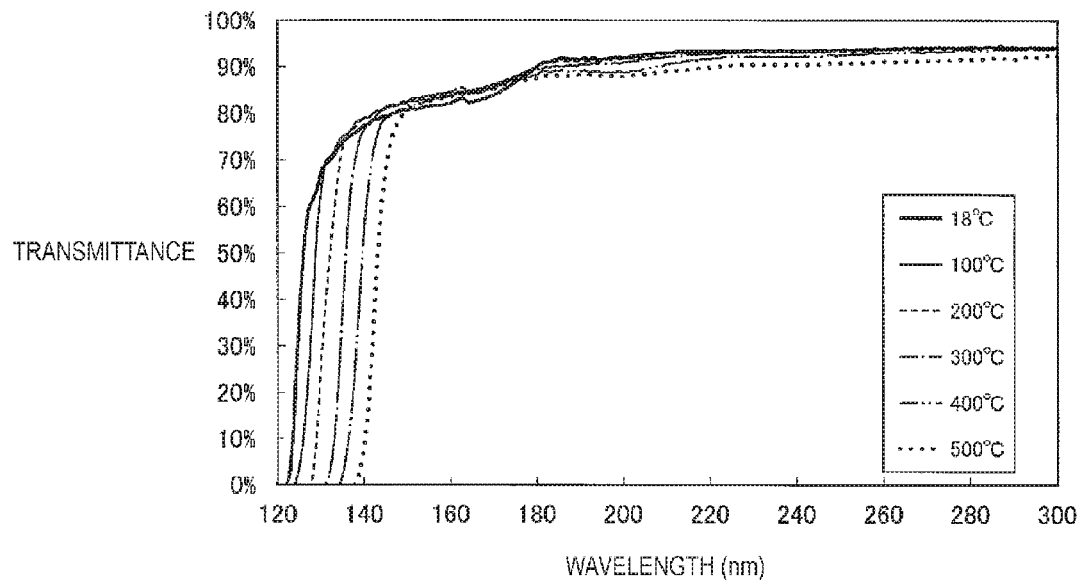
FIG. 1 is a graph of transmission characteristics of calcium fluoride in the ultraviolet region.
Figure 2:
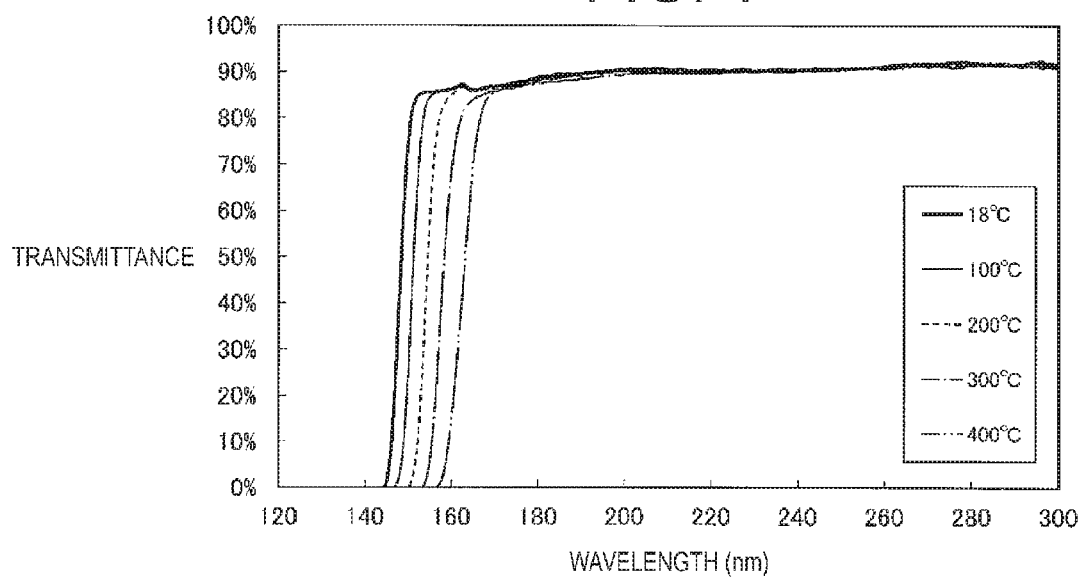
FIG. 2 is a graph of transmission characteristics of crystal in the ultraviolet region.
Figure 3:
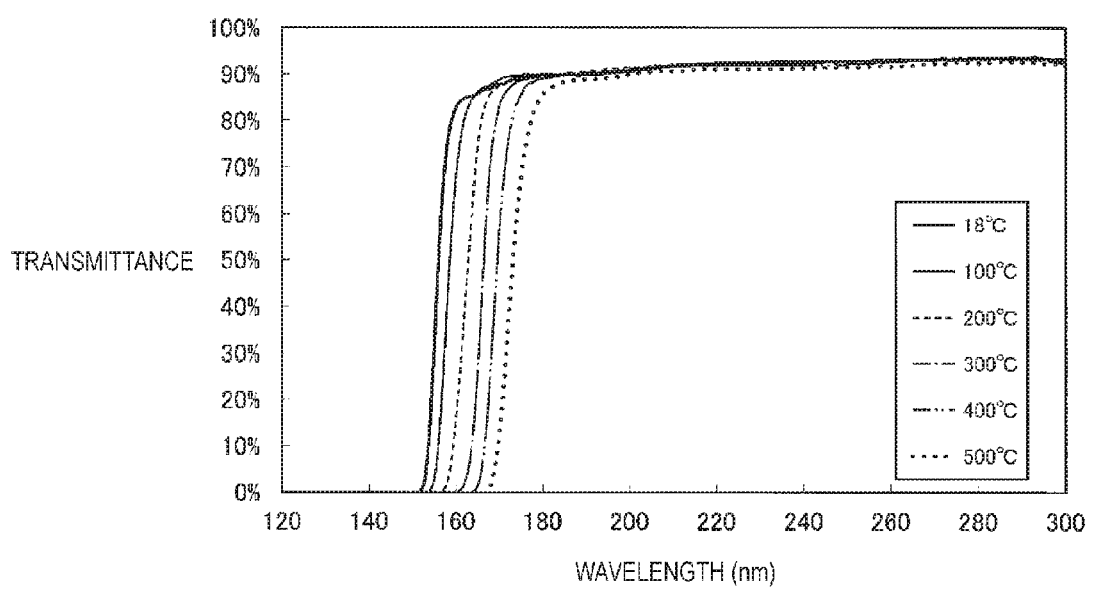
FIG. 3 is a graph of transmission characteristics of quartz glass in the ultraviolet region.

Here, graphs of transmission characteristics of various materials in the ultraviolet region, where the wavelength is 300 nm or less, are shown in FIGS. 1 to 3. FIG. 1 depicts the transmission characteristics of calcium fluoride ($CaF_2$), FIG. 2 depicts the transmission characteristics of crystal (crystalline state), and FIG. 3 depicts the transmission characteristics of quartz glass. The thickness of each measured material is 10 mm. In each graph, wavelength is shown on the horizontal axis and transmittance is shown on the vertical axis. Transmission characteristics at each of the temperatures shifted in a range from 18° C. (room temperature) to 500° C. are plotted in the figures. In these transmission characteristics, the wavelength on the short wavelength side where the transmittance decreases rapidly is the absorption edge wavelength. For example, the absorption edge wavelength of calcium fluoride is about 122 nm at temperature conditions of room temperature levels (18° C.). It is clear from the figures that the absorption edge wavelength shifts to the long wavelength side as the temperature of the ultraviolet light transmittance material rises. A detailed description will be given later, but a linear proportional relationship exists between the temperature of the ultraviolet light transmittance member and the absorption edge wavelength and, by detecting the absorption edge wavelength, the temperature of the ultraviolet light transmittance member can be derived from the absorption edge wavelength. Additionally, due to the fact that the transmittance of ultraviolet light changes depending on the thickness of the member, the transmission characteristics, the relationship between the temperature and the absorption edge wavelength, and the like depicted in FIGS. 1 to 3 are set according to the thickness of the ultraviolet light transmittance member that is used.

First Embodiment

Figure 4:
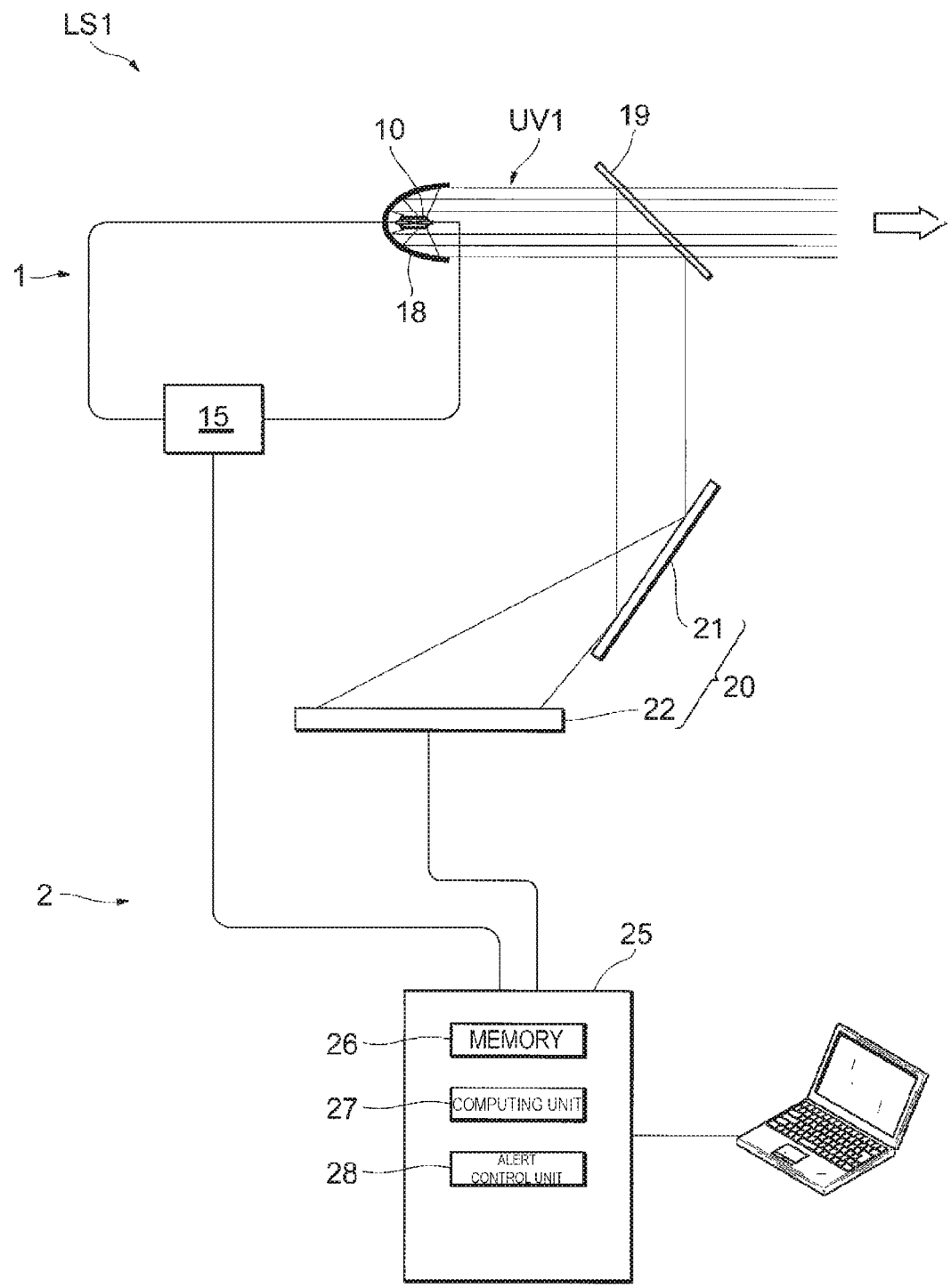
FIG. 4 is a summary configuration diagram of a light source device according to a first embodiment that includes a temperature measurement device.
Figure 5:
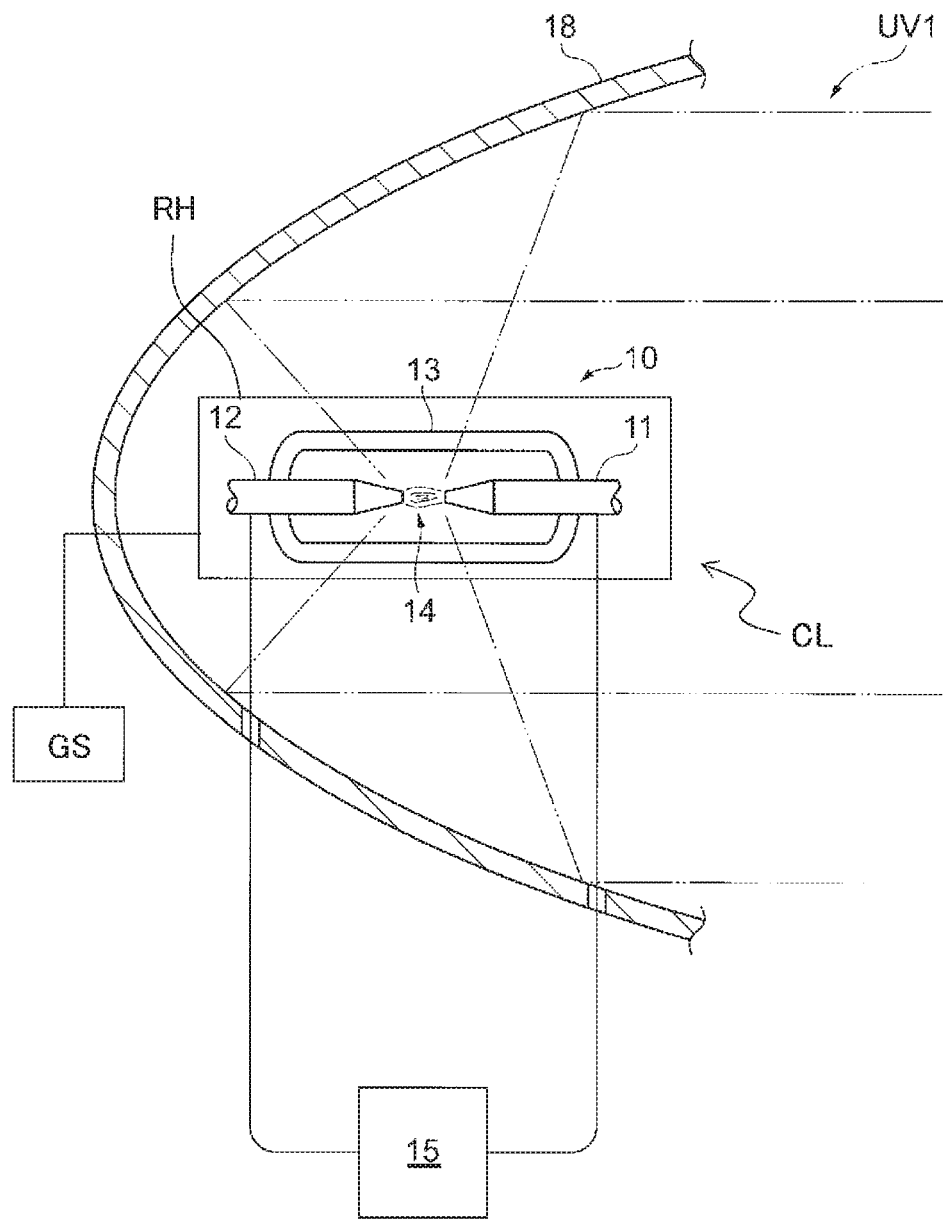
FIG. 5 is a schematic diagram of a light source in the light source device of FIG. 4.

Embodiments for carrying out the present disclosure will be described hereinafter in detail while referring to the drawings. As a first embodiment exemplifying the present disclosure, FIG. 4 depicts a summary configuration diagram of a light source device LS1 including a temperature measurement device for measuring the temperature of an ultraviolet light transmittance member (an ultraviolet light transmitting member; an ultraviolet light transmission member); and FIG. 5 depicts a schematic diagram of a light source of the light source device LS1. In this embodiment, a configuration is provided in which a deuterium lamp is used as an example of a light source for generating ultraviolet light, and a calcium fluoride tube is used as the housing (also referred to as "chamber", "bulb", or the like) of the deuterium lamp.

The light source device LS1 includes a light source 1 for generating ultraviolet light of a spectrum in the vacuum ultraviolet region, and a temperature measurement device 2 for measuring the temperature of the housing of the deuterium lamp in the light source 1.

The light source 1 includes a deuterium lamp ($D_2$ lamp) 10, and a lamp power source 15 for supplying electrical power to the deuterium lamp 10. The deuterium lamp 10 is constituted from an anode 11, a cathode 12, and a housing 13. A cylindrical tube formed from calcium fluoride ($CaF_2$) as a raw material is machined and molded into the housing 13. The deuterium lamp 10 is configured such that the anode 11 and the cathode 12 are fused at both ends of the housing 13, separated by a predetermined gap, and an interior of the housing 13 is filled with deuterium gas.

Figure 6:
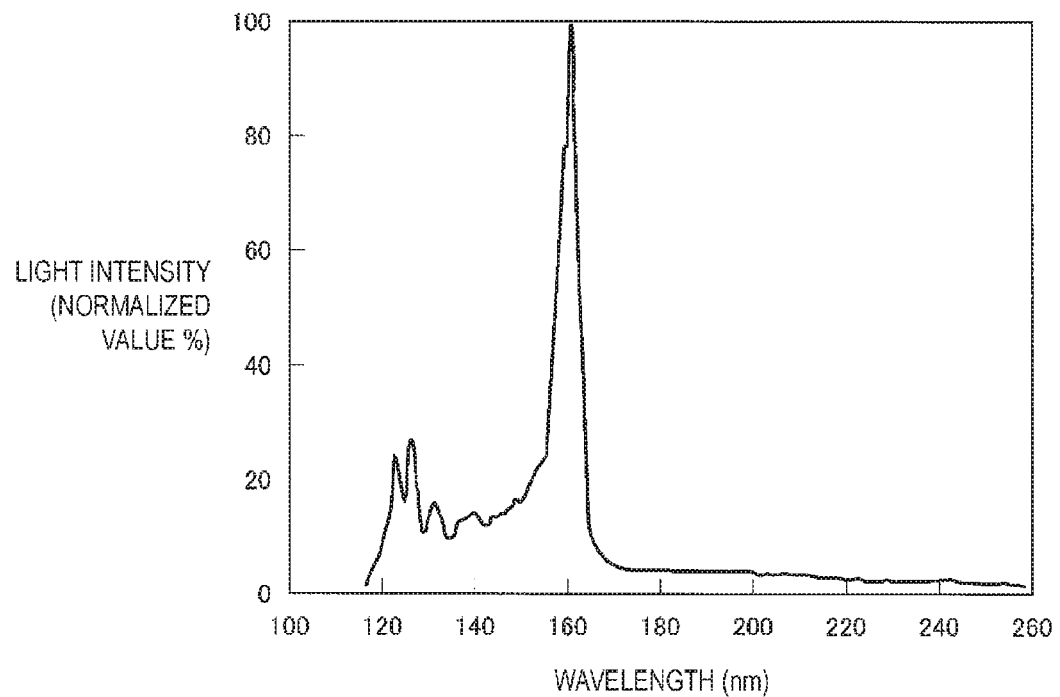
FIG. 6 is an example of an emission spectrum of a deuterium lamp.

The lamp power source 15 is electrically connected to the anode 11 and the cathode 12, and DC electrical power is supplied to the anode 11 and the cathode 12 from the lamp power source 15. When the DC electrical power is supplied, electrical discharge occurs between the anode 11 and the cathode 12, the plasma of the deuterium excited by the electrical discharge emits light, and ultraviolet light UV1 of a spectrum in the vacuum ultraviolet region is generated. In other words, the electrical discharge region between the anode 11 and the cathode 12 corresponds to a light source portion 14 of the deuterium lamp 10. An example of an emission spectrum of the ultraviolet light UV1 generated by the light source portion 14 is depicted in FIG. 6. In FIG. 6, wavelength is shown on the horizontal axis and normalized light intensity (light output) is shown on the vertical axis. From FIG. 6, it is clear that the emission spectrum of the deuterium lamp 10 has a strong peak (emission line) near 160 nm, and that the emission band extends up to regions less than or equal to 120 nm on the side of shorter wavelengths.

The ultraviolet light UV1 generated by the light source portion 14 transmits through the ultraviolet light transmittance member, namely the housing 13, and exits the deuterium lamp 10. The ultraviolet light UV1 that has exited from the deuterium lamp 10 is collected and collimated by a parabolic mirror or similar condensing member 18, and then output from the light source device LS1. A portion (e.g. about a few percent) of the ultraviolet light UV1 that has been output from the light source device LS1 is split off by a beam splitter 19 and enters the temperature measurement device 2.

The temperature measurement device 2 includes a spectroscopic measurement unit 20 for detecting the intensity distribution (spectrum or spectral intensity distribution) of the ultraviolet light UV1 split off by the beam splitter 19; and a calculation processing unit 25 for obtaining the absorption edge wavelength of the housing 13 from the intensity distribution of the ultraviolet light, and deriving the temperature of the housing 13 on the basis of the obtained absorption edge wavelength.

The spectroscopic measurement unit 20 includes a spectral separation member 21 for spectrally separating the ultraviolet light UV1, and an intensity distribution detector 22 for detecting the intensity distribution of the ultraviolet light UV1 spectrally-separated by the spectral separation member 21. Examples of the spectral separation member 21 for spectrally separating the ultraviolet light UV1 include diffraction gratings formed from a metal material that reflects light of the wavelength band of the ultraviolet light UV1, prisms formed from an ultraviolet light transmittance material through which light of the wavelength band of the ultraviolet light UV1 passes, and the like. FIG. 4 illustrates a configuration in which a diffraction grating is used. Examples of the intensity distribution detector 22 include photodiode arrays and photomultipliers that have sensitivity to light of the wavelength band of the ultraviolet light UV1. FIG. 4 illustrates a configuration in which a photodiode array is used. Signals of the intensity distribution of the ultraviolet light UV1 detected by the intensity distribution detector 22 are output from the spectroscopic measurement unit 20 and input into the calculation processing unit 25.

The calculation processing unit 25 includes a memory 26 for storing a preset temperature derivation program, characteristic data pertaining to the housing 13, and the like; a computing unit 27 for deriving the temperature of the housing 13 from the intensity distribution of the ultraviolet light UV1 detected by the spectroscopic measurement unit 20 and the characteristic data stored in the memory 26, on the basis of the temperature derivation program; and an alert control unit 28 for performing alert operations when the temperature of the housing 13 derived by the computing unit 27 becomes greater than or equal to a preset reference value.

The temperature derivation program, for deriving the temperature of the housing 13 from the characteristic data pertaining to the housing 13, the intensity distribution of the ultraviolet light UV1, and the like, is set/stored (set and/or stored) in advance in the memory 26. The temperature derivation program includes an absorption edge wavelength detection sub-program for obtaining the absorption edge wavelength of the housing 13 from the intensity distribution of the ultraviolet light UV1, and a wavelength temperature conversion sub-program for calculating the temperature of the housing 13 from the obtained absorption edge wavelength. Examples of the characteristic data pertaining to the housing 13 include the transmission characteristics of calcium fluoride such as depicted in FIG. 1, the emission spectrum of the light source portion 14 as depicted in FIG. 6, and the like.

Hereinafter, a method for deriving the housing temperature by the calculation processing unit 25 will be described. First, working examples of absorption edge wavelength detection methods for obtaining the absorption edge wavelength of the housing 13 from the intensity distribution of the ultraviolet light UV1 detected by the spectroscopic measurement unit 20 (the intensity distribution detector 22) will be described.

Working Example 1

Figure 7:
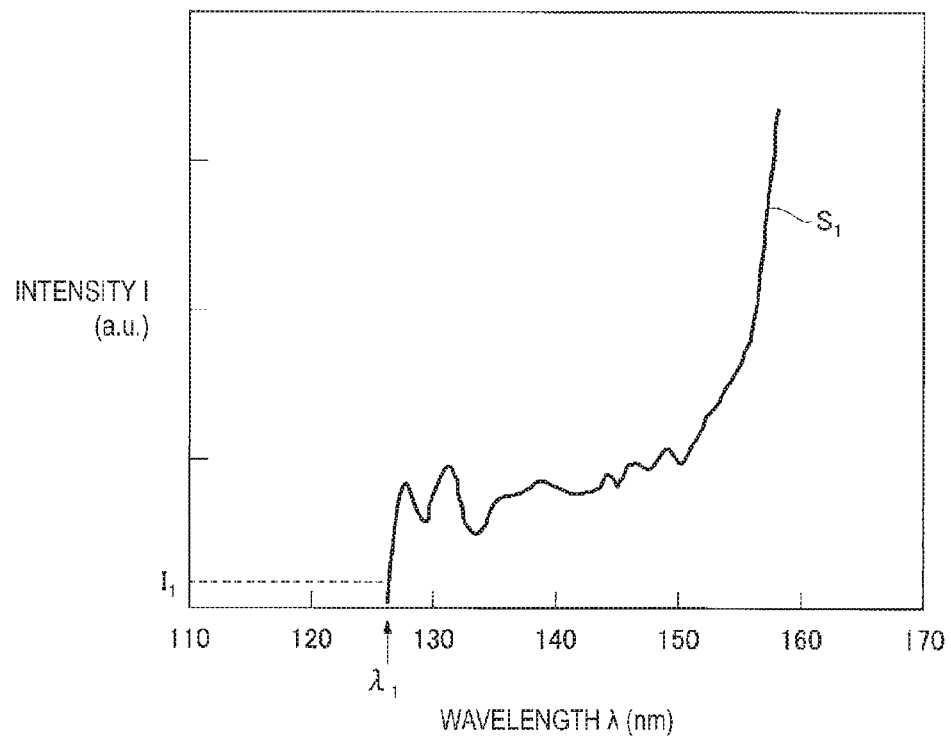
FIG. 7 is an explanatory diagram for explaining a method for detecting an absorption edge wavelength according to Working Example 1.

In an absorption edge wavelength detection method of Working Example 1, a wavelength where the intensity in the intensity distribution of the ultraviolet light UV1 detected by the spectroscopic measurement unit 20 becomes less than or equal to a predetermined reference value is defined as the absorption edge wavelength. FIG. 7 depicts an explanatory diagram for explaining a method for detecting the absorption edge wavelength of Working Example 1. The wavelength of the light included in the ultraviolet light UV1 is shown on the horizontal axis of the graph and the intensity is shown on the vertical axis. An example of the intensity distribution of the ultraviolet light UV1 detected by the intensity distribution detector 22 is plotted on the graph. As depicted, in the intensity distribution $S_1$ of the ultraviolet light UV1, the intensity has become less than or equal to an intensity $I_1$, indicated by a dashed line, near wavelength 127.5 nm. The intensity $I_1$ indicated by the dashed line in FIG. 7 is set/stored in the memory 26 as the reference value; the computing unit 27 detects a wavelength $\lambda_1$ where the intensity becomes less than or equal to the reference value $I_1$ from the data of the intensity distribution $S_1$ of the ultraviolet light UV1 output from the intensity distribution detector 22; and this $\lambda_1$ is defined as the absorption edge wavelength of the housing 13. Note that the intensity reference value $I_1$ can be appropriately set to a range of about 1% to 30% of the intensity of the light of the wavelength $\lambda_1$ detected in a state where the temperature is room temperature level (18° C.).

Working Example 2

Figure 8:
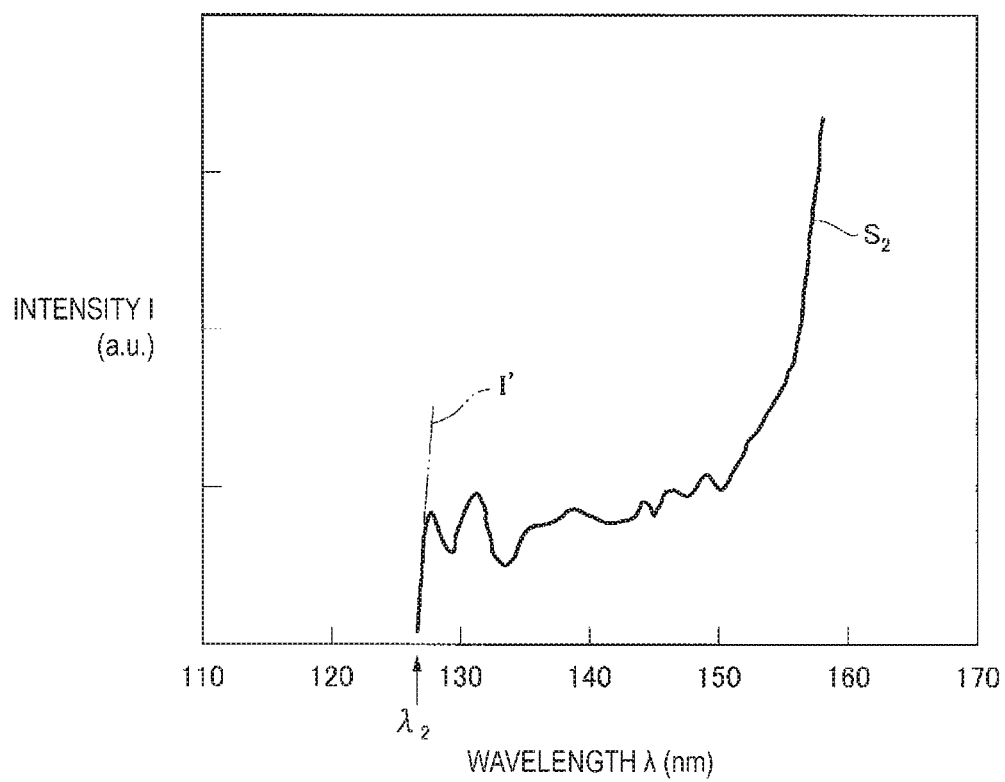
FIG. 8 is an explanatory diagram for explaining a method for detecting an absorption edge wavelength according to Working Example 2.

In an absorption edge wavelength detection method of Working Example 2, a wavelength in the intensity distribution of the ultraviolet light UV1 detected by the spectroscopic measurement unit 20 where $dI/d\lambda$, that is, the slope of the intensity distribution, where $\lambda$ is the wavelength and $I$ is the intensity, becomes greater than or equal to a predetermined reference value is defined to be the absorption edge wavelength of the housing 13. FIG. 8 depicts an explanatory diagram for explaining this method for detecting the absorption edge wavelength. As in FIG. 7, the wavelength of the light included in the ultraviolet light UV1 is shown on the horizontal axis and the intensity is shown on the vertical axis. An example of the intensity distribution of the ultraviolet light UV1 detected by the intensity distribution detector 22 is plotted on the graph. As depicted, in an intensity distribution $S_2$ of the ultraviolet light UV1, the value of $dI/d\lambda$, that is, the slope of the intensity distribution, near wavelength 127.5 nm indicated by the two-dot dash line rapidly increases. A value I', which is $dI/d\lambda$, indicated by the two-dot dash line is set/stored in the memory 26 as the reference value; the computing unit 27 detects a wavelength $\lambda_2$ where $dI/d\lambda$, becomes greater than or equal to the reference value I' from the data of the intensity distribution $S_2$ of the ultraviolet light UV1 output from the intensity distribution detector 22; and this $\lambda_2$ is defined as the absorption edge wavelength.

Working Example 3

Figure 9A:
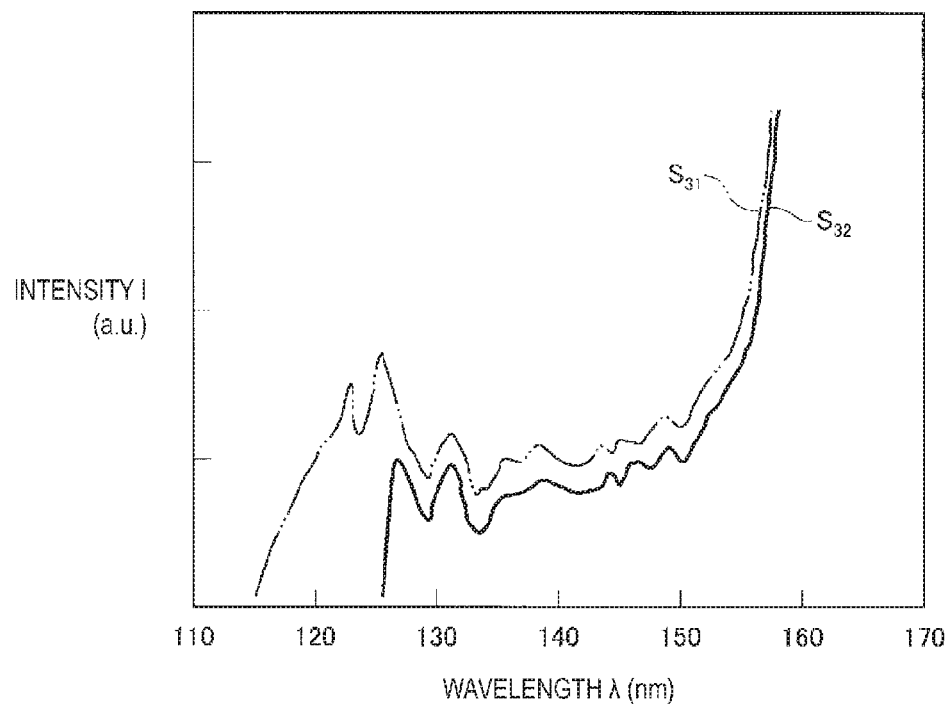
FIGS. 9A and 9B are explanatory diagrams for explaining a method for detecting an absorption edge wavelength according to Working Example 3.
Figure 9B:
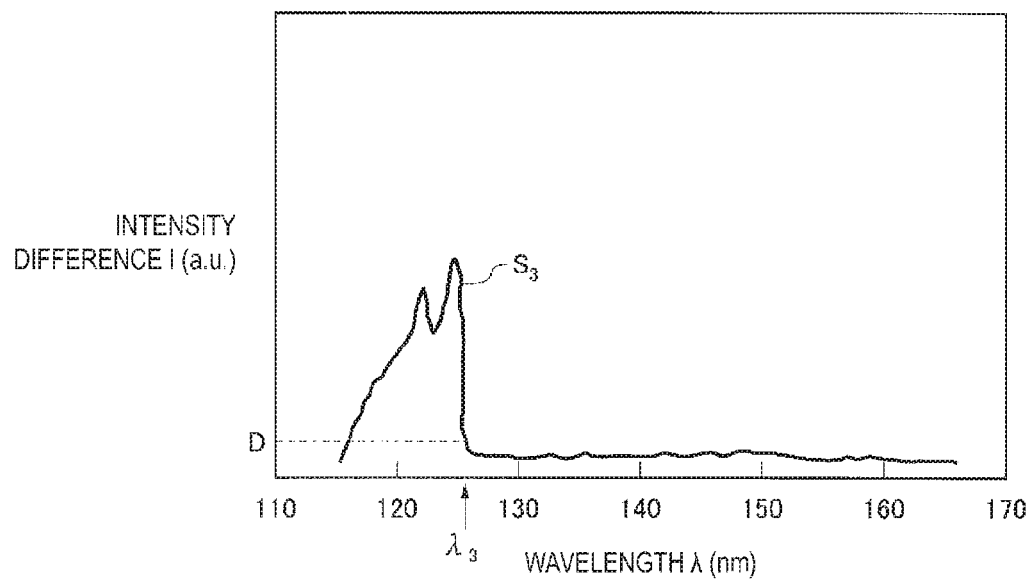

In an absorption edge wavelength detection method of Working Example 3, the emission spectrum (intensity distribution) of the ultraviolet light UV1 near the light source portion 14 set/stored in advance in the memory 26 is compared with the intensity distribution of the ultraviolet light UV1 that has transmitted through the housing 13 and has been detected by the spectroscopic measurement unit 20; and a wavelength where the difference is greater than or equal to a predetermined reference value is defined as the absorption edge wavelength of the housing 13. FIGS. 9A and 9B depict explanatory diagrams for explaining this method for detecting the absorption edge wavelength. As in FIGS. 7 and 8, the wavelength of the light included in the ultraviolet light UV1 is shown on the horizontal axes and the intensity is shown on the vertical axes in these graphs. An emission spectrum $S_{31}$ of the ultraviolet light UV1 near the light source portion 14 in FIG. 9A is plotted on the graph as a two-dot dash line, and an intensity distribution $S_{32}$ of the ultraviolet light UV1 that has transmitted through the housing 13 and has been detected by the intensity distribution detector 22 is plotted on the graph as a solid line. Additionally, intensity characteristics (spectral intensity characteristics) $S_3$ of a difference $(S_{31}-S_{32})$ obtained by subtracting the intensity distribution $S_{32}$ of the ultraviolet light UV1 detected by the intensity distribution detector 22 from the emission spectrum $S_{31}$ of the ultraviolet light UV1 near the light source portion 14, is plotted in FIG. 9B.

Here, the emission spectrum $S_{31}$ of the ultraviolet light UV1 near the light source portion 14 is the intensity distribution of the ultraviolet light UV1 prior to transmitting through the housing 13; the intensity distribution $S_{32}$ of the ultraviolet light UV1 detected by the intensity distribution detector 22 is the intensity distribution of the ultraviolet light UV1 after transmitting through the housing 13; and the intensity characteristics $S_3$ of the difference represent the characteristics of the loss that occurs when the ultraviolet light UV1 transmitted through the housing 13. Moreover, the fact that a region where loss is great exists in the short wavelength region means that absorption of the light having a wavelength in this region is occurring at the housing 13, and a wavelength $\lambda_3$ where the difference rapidly increases is the absorption edge wavelength of the housing 13. Data of the emission spectrum $S_{31}$ of the light source portion 14 and a reference value D of the difference are set/stored in advance in the memory 26; the computing unit 27 detects the wavelength $\lambda_3$ where the difference is greater than or equal to the reference value D from the intensity characteristics $S_3$ of the difference obtained by subtracting the intensity distribution $S_{32}$ of the ultraviolet light UV1 detected by the intensity distribution detector 22 from the emission spectrum $S_{31}$ of the ultraviolet light UV1 near the light source portion 14; and this wavelength $\lambda_3$ is defined as the absorption edge wavelength.

Note that in the working example described above, the method in which the difference $(S_{31}-S_{32})$ between the emission spectrum $S_{31}$ and the intensity distribution $S_{32}$ was obtained was given as an example of a processing method for obtaining the difference between the emission spectrum of the ultraviolet light UV1 near the light source portion 14 and the intensity distribution of the ultraviolet light UV1 detected by the intensity distribution detector 22. However, other processing methods may be used provided that a wavelength can be obtained where the difference between the emission spectrum $S_{31}$ and the intensity distribution $S_{32}$ described above becomes greater than or equal to a reference value, less than or equal to a reference value, or equal to a reference value. For example, a configuration is possible in which the intensity distribution $S_{32}$ of the ultraviolet light UV1 detected by the intensity distribution detector 22 is divided by the emission spectrum $S_{31}$ of the ultraviolet light UV1 near the light source portion 14, and a wavelength is detected where the value of $S_{32}/S_{31}$ is less than or equal to a reference value.

The calculation processing unit 25 derives the temperature of the housing 13 from the absorption edge wavelength obtained as described above as follows. First, return to FIG. 1. From this drawing, it is understood that, in cases where the material of the housing 13 is calcium fluoride ($CaF_2$), the absorption edge wavelength of the housing 13 when the temperature is 18° C. (room temperature level) is approximately 122 nm. As the temperature rises, the absorption edge wavelength shifts to the long wavelength side, and at 500° C., the absorption edge wavelength is approximately 140 nm. Note that the absorption edge wavelength is defined as the wavelength where transmittance becomes less than 1%.

Figure 10:
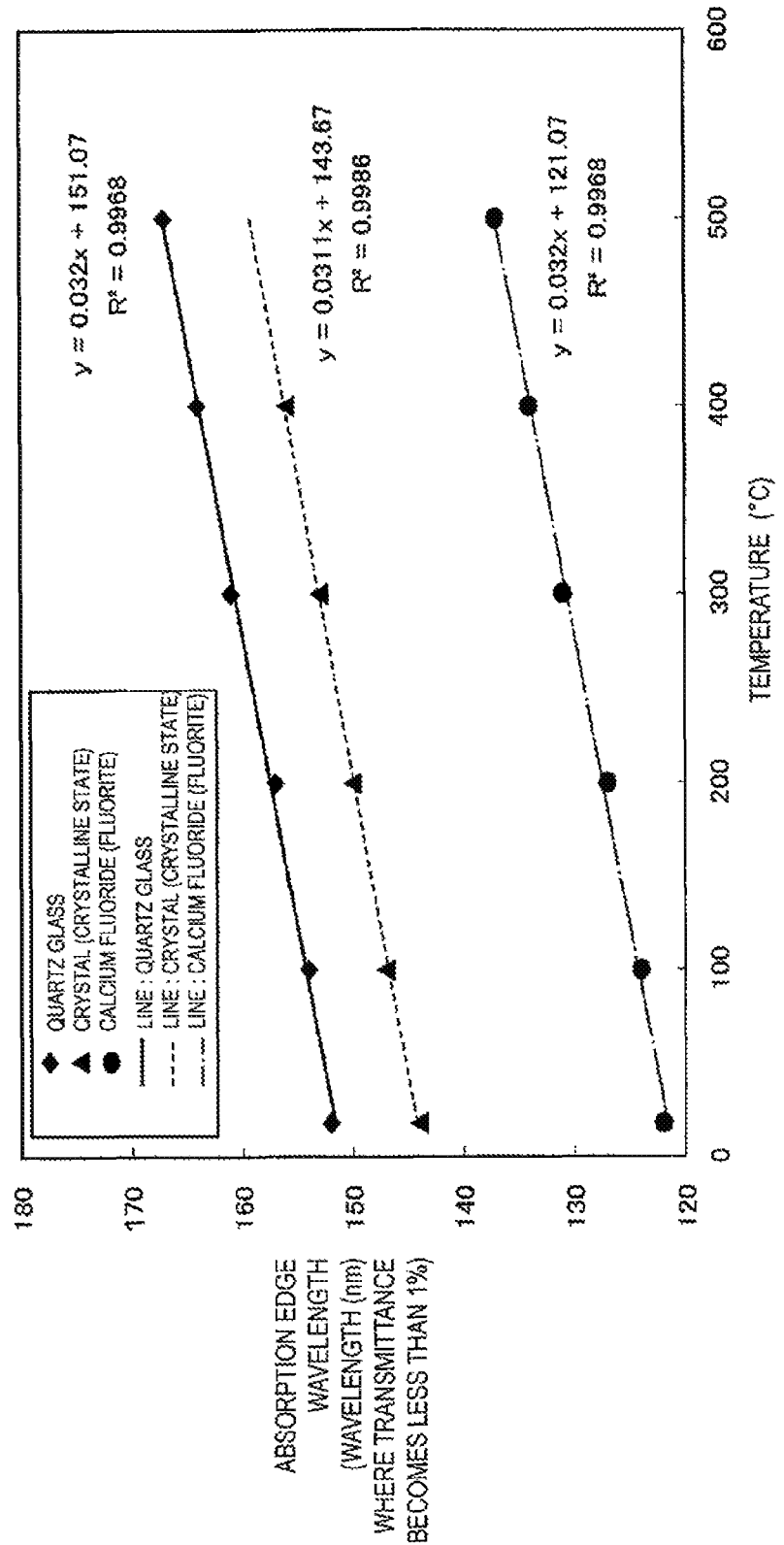
FIG. 10 is a graph on which relationships between the temperature of the ultraviolet light transmittance member and the absorption edge wavelength are plotted.

FIG. 10 is a graph wherein the relationships between temperature and absorption edge wavelength in FIG. 1 are depicted in another manner. Temperature is shown on the horizontal axis of the graph and absorption edge wavelength is shown on the vertical axis (as in FIG. 1, the absorption edge wavelength is the wavelength where transmittance becomes less than 1%). In addition to data for calcium fluoride which is the material of the housing 13, data for crystal as in FIG. 2, and data for quartz glass ($SiO_2$) as in FIG. 3 are also plotted on FIG. 10. Additionally, regression lines obtained by the method of least squares are shown as a dot-dash line for calcium fluoride, a dashed line for crystal, and a solid line for quartz glass. Moreover, a regression formula and a determination coefficient (multiple determination) $R^2$ for each material are shown in FIG. 10. In the regression formulas (hereinafter referred to as "the characteristics formulas"), "x" is the temperature, and "y" is the absorption edge wavelength.

From this figure, it is clear that while there are differences in the coefficients of the characteristics formula for each material, a linear proportional relationship exists between the absorption edge wavelength and the temperature of each of the materials. Accordingly, it is understood that it is possible to accurately derive the temperature of the ultraviolet light transmittance member from the absorption edge wavelength on the basis of the characteristics formulas obtained as described above. For example, in a case where the material of the housing 13 is calcium fluoride, if the detected absorption edge wavelength is 127.5 nm, the temperature of the housing 13 is derived from the characteristics formula of the calcium fluoride and is about 200° C.

Note that, description has been given of a case in which the absorption edge wavelength is defined as the wavelength where transmittance becomes less than 1%, and the characteristics formulas are obtained with the absorption edge wavelength thus obtained. However, there is a linear proportional relationship between the temperature and the absorption edge wavelength and the characteristics formulas can be obtained in the same manner for cases in which the absorption edge wavelength is the wavelength where the intensity of the transmitted light becomes less than or equal to a reference value (Working Example 1), cases in which the absorption edge wavelength is the wavelength where $dI/d\lambda$, becomes greater than or equal to a reference value (Working Example 2), and cases in which the absorption edge wavelength is the wavelength where the difference between the emission spectrum of the light source unit and the ultraviolet light intensity distribution is greater than or equal to a reference value (Working Example 3). Thus, the temperature of the housing 13 can be derived on the basis of each characteristics formula. Additionally, as mentioned previously, the transmittance of the ultraviolet light varies depending on the thickness of the member and, thus, the characteristics formulas may differ depending on the shape, dimensions, and the like of the measurement target, namely, the housing 13. The characteristics formulas are set/stored in advance in the memory 26.

The calculation processing unit 25 derives the temperature of the housing 13 on the basis of the absorption edge wavelength of the housing 13 detected via at least one of the methods of Working Examples 1 to 3, described above. Specifically, the characteristics formulas stored in the memory 26 are read out to the computing unit 27 and, for example, an absorption edge wavelength $\lambda_1$ detected via the method of Working Example 1 is substituted in and the temperature of the housing 13 is derived. Then, the calculated housing temperature is output to an operating panel or external personal computer (not illustrated in the drawings) via an I/O circuit, and displayed as the "housing temperature".

Additionally, when the calculated housing temperature is greater than or equal to a predetermined reference value set/stored in the memory 26 in advance, the calculation processing unit 25 performs alert operations such as those described below. The reference value set/stored in the memory 26 is set in accordance with the material, shape, dimensions, and the like of the housing 13. For example, when the temperature of calcium fluoride becomes about 210° C. or higher, slip begins to occur at the crystal interface, and the mechanical strength thereof declines. Accordingly, in cases such as in the present embodiment where the material of the housing 13 is calcium fluoride, a temperature of approximately 190 to 210° C. (e.g. 200° C.) is set/stored in the memory 26 as a reference temperature for alarm occurrence. This is because if the reference temperature is set to lower than 190° C., the emission intensity of the light source portion 14 may be suppressed to unnecessarily low levels or the operation rate may decline; and if the reference temperature is set to higher than 210° C., the housing 13 may be damaged. As another example, in cases where the material of the housing 13 is crystal, a temperature of approximately 380 to 420° C. (e.g. 400° C.) is set/stored in the memory 26 as the reference temperature for alert operations. This is because structural change occurs in crystal at around 450° C.

The calculation processing unit 25 causes an alert control unit 28 to perform alert operations when the temperature of the housing 13 calculated by the computing unit 27 becomes greater than or equal to the reference temperature set/stored in the memory 26. In the present specification, "alert operations" is a concept including visual alerts that perform alarm displays via a rotating lamp, a liquid crystal display screen, or the like; audio alerts that produce alarm sounds via a speaker or the like; active control alerts that reduce the light intensity of the ultraviolet light UV1 generated by the light source portion 14 or strengthen cooling of the ultraviolet light transmittance member by increasing cooling capacity of a cooling structure; and the like. Herein, the configuration examples of Working Example 4 and Working Example 5 are given as examples of active control alerts.

Working Example 4

The alert control unit 28 performs alert operations to reduce the emission intensity of the ultraviolet light UV1 generated by the light source portion 14 of the deuterium lamp 10. Specifically, the alert control unit 28 outputs an alert signal to the lamp power source 15 of the deuterium lamp 10 and decreases the electrical discharge power between the anode 11 and the cathode 12, thereby reducing the emission intensity of the ultraviolet light UV1 generated by the light source portion 14. For example, the emission intensity is reduced to about 80% of the emission intensity prior to the alert occurrence. At this time, the alert control unit 28 also outputs the alert signal to an operation panel, external personal computer, or the like (not illustrated in the drawings) via the I/O circuit, and displays a message such as "emission intensity reduced to 80% due to housing temperature becoming greater than or equal to reference value". Preferably a visual alert informing of an abnormality via a rotating lamp or an audio alert such as beeping is performed, simultaneously with the active control alert.

Working Example 5

The alert control unit 28 performs alert operations to strengthen cooling of the housing 13 by increasing the cooling capacity of a cooling structure that cools the deuterium lamp 10. When describing the light source device LS1, mention has been omitted for the sake of remaining concise, but the light source 1 includes a cooling structure CL for cooling the deuterium lamp 10. A configuration in which nitrogen gas is used to shield the deuterium lamp 10 from the atmospheric environment and also for the cooling of the deuterium lamp 10 is described as an example of the cooling structure CL. Here, the deuterium lamp 10 is attached within a lamp housing RH that has an airtight structure. A gas supply unit GS for feeding nitrogen gas is connected to the lamp housing RH and fresh nitrogen gas is constantly purged or supplied at an appropriate flow rate. As such, the deuterium lamp 10 is shielded from the atmospheric environment and the housing 13 is cooled by the nitrogen gas flowing around the lamp. The cooling capacity of the cooling structure CL can be increased and decreased by changing the flow rate of the nitrogen gas supplied from the gas supply unit GS. That is, in this working example, the lamp housing RH and the gas supply unit GS constitute the cooling structure CL.

When the temperature of the housing 13 becomes higher than or equal to the reference temperature, the alert control unit 28 outputs an alert signal to the gas supply unit GS and increases the flow rate of the nitrogen gas so as to increase the cooling capacity of the cooling structure CL. For example, the nitrogen gas is supplied by the gas supply unit GS at a flow rate that is increased 20% over the flow rate prior to the alert occurrence. At this time, the alert control unit 28 also outputs the alert signal to an operation panel, external personal computer, or the like (not illustrated in the drawings) via the I/O circuit, and displays a message such as "nitrogen gas supply amount increased 20% due to housing temperature becoming greater than or equal to reference value". Preferably a visual alert informing of an abnormality via a rotating lamp or an audio alert such as beeping is performed, simultaneously with the active control alert.

Note that in a case of a cooling structure in which the housing 13 is cooled by providing a jacket (not illustrated in the drawings) around the periphery of the deuterium lamp 10 and supplying cooling water (a cooling medium) thereto, as with the case described above where nitrogen gas is purged, the cooling capacity can be increased by increasing the flow rate of the cooling water or the like. Additionally, the cooling structure may have a configuration in which the cooling capacity is increased by lowering the temperature of the cooling water or the like.

According to the light source device LS1 including the temperature measurement device 2 described above, the temperature of the housing 13 can be accurately measured with a concise configuration, and the occurrence of problems caused by temperature increases of the housing 13 can be prevented.

Second Embodiment

Figure 11:
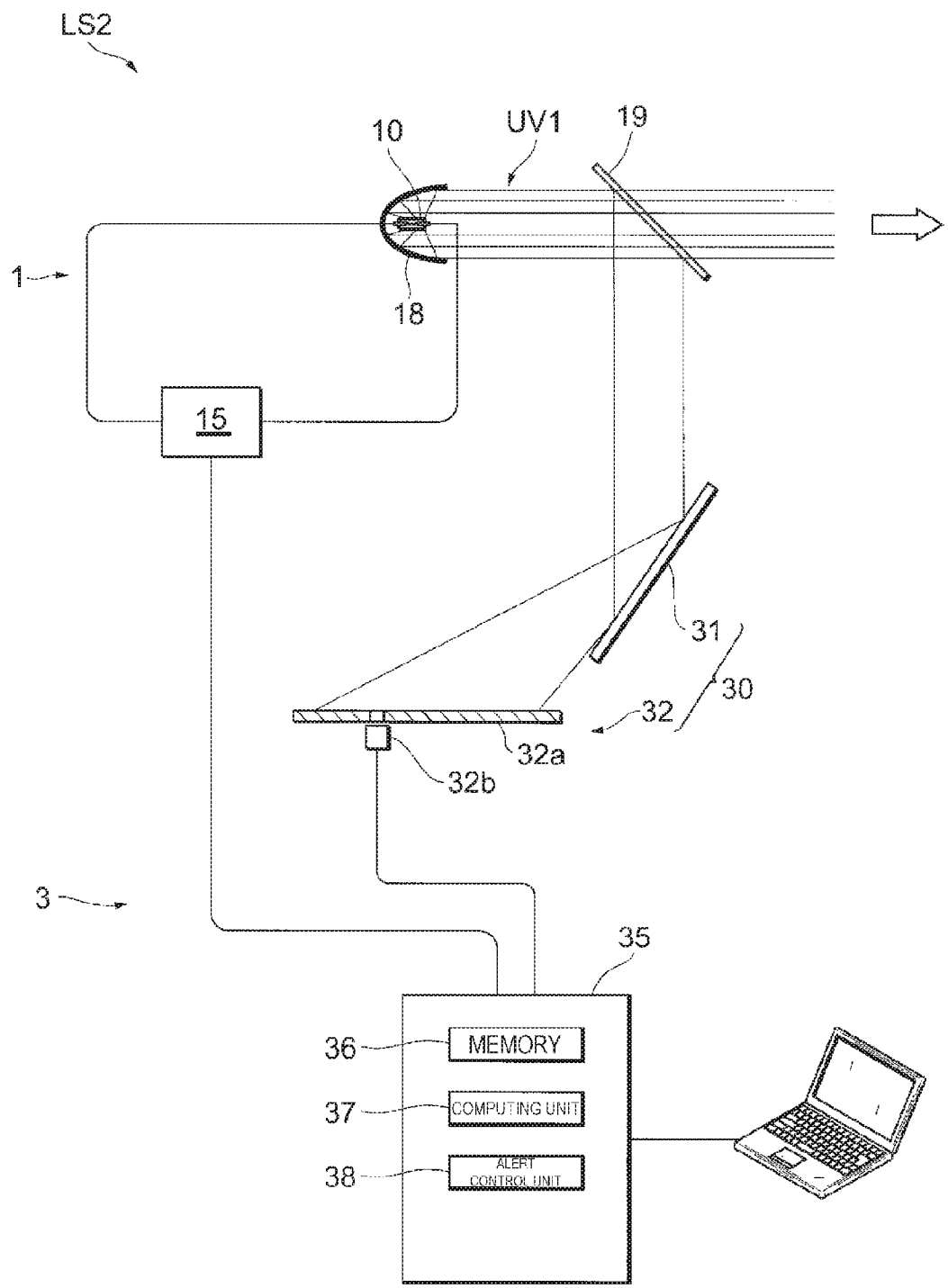
FIG. 11 is a summary configuration diagram of a light source device according to a second embodiment that includes a temperature measurement device.

Next, as a second embodiment exemplifying the present disclosure, FIG. 11 depicts a summary configuration diagram of a light source device LS2 including a temperature measurement device 3. Hereinafter, the light source device LS2 of the second embodiment will be described while referring to FIG. 11. Other than the configuration of a temperature measurement device 3 of a light source device LS2 of this embodiment differing from the temperature measurement device 2 of the light source device LS1, the configuration of a light source 1 of the light source device LS2 is the same as that of the light source 1 of the light source device LS1. Therefore, identical constituents are marked with identical reference numerals and repeated description thereof is omitted; and the temperature measurement device 3 that differs from the temperature measurement device 2 is described in detail.

The light source device LS2 mainly includes a light source 1, that includes a deuterium lamp 10, for generating ultraviolet light UV1 of a spectrum in the vacuum ultraviolet region; and a temperature measurement device 3 for detecting when the temperature of the housing 13 of the deuterium lamp 10 becomes greater than or equal to a preset reference value, and performing alert operations.

The temperature measurement device 3 includes a spectroscopic measurement unit 30 for spectrally separating the ultraviolet light UV1 split off by the beam splitter 19 and detecting the intensity of light of a predetermined wavelength; and a calculation processing unit 35 for determining whether or not the intensity of the light detected by the spectroscopic measurement unit 30 is less than or equal to a reference value.

The spectroscopic measurement unit 30 includes a spectral separation member 31 for spectrally separating the ultraviolet light UV1, and a spectral detector 32 for detecting the intensity of light of a predetermined wavelength from among the light spectrally-separated by the spectral separation member 31. A configuration is depicted in FIG. 11 in which a diffraction grating is used as the spectral separation member 31; and an aperture plate 32a provided with an aperture at a position corresponding to a predetermined wavelength of the spectrally-separated light, and a photodiode 32b arranged on a backside (below in FIG. 11) of the aperture are used as the spectral detector 32 for detecting the intensity of light of the predetermined wavelength.

Here, the predetermined wavelength described above is the absorption edge wavelength of the housing 13 when the temperature of the housing 13 is equal to a reference temperature. The reference temperature is a temperature at which further use of the housing 13 at a temperature range above the reference temperature should be prevented; and, in cases where the material of the housing 13 is calcium fluoride, is set to about 190 to 210° C., for example, to 200° C. The absorption edge wavelength when the temperature of calcium fluoride becomes 200° C. (the wavelength where the transmittance becomes less than 1% is used as the absorption edge wavelength) is approximately 127.5 nm, as depicted in FIG. 10. Accordingly, the aperture of the aperture plate 32a is set to the position of the 127.5 nm wavelength and the intensity of light at this wavelength is detected by the photodiode 32b. At this time, the intensity of the light at the 127.5 nm wavelength detected by the photodiode 32b becoming less than or equal to a reference value (e.g. 10% of the intensity of light at the 127.5 nm wavelength detected at room temperature) means that the temperature of the housing 13 has become higher than or equal to the 200° C. reference temperature. Signals of the light intensity of the absorption edge wavelength of the housing 13 detected by the spectral detector 32 are output from the spectroscopic measurement unit 30 and input into the calculation processing unit 35.

The calculation processing unit 35 includes a memory 36 for storing the preset reference value described above; a computing unit 37 for comparing the intensity of the light detected by the spectroscopic measurement unit 30 with the reference value set in the memory 36, and determining whether or not the light intensity is less than or equal to the reference value; and an alert control unit 38 for performing alert operations when the computing unit 37 determines that the intensity of the light detected by the spectroscopic measurement unit 30 has become less than or equal to the reference value.

The calculation processing unit 35 causes the alert control unit 38 to perform alert operations when the computing unit 37 determines that the intensity of the light detected by the spectroscopic measurement unit 30 has become less than or equal to the reference value set in the memory 36. The specific control details of the alert operations executed by the alert control unit 38 are the same as the control details of the alert control unit 28 described previously in Working Examples 4 and 5 of the first embodiment.

Thus, according to the light source device LS2 including the temperature measurement device 3 described above, the temperature of the housing 13 can be accurately measured with a concise and inexpensive device configuration, and the occurrence of problems caused by temperature increases of the housing 13 can be prevented.

Note that in the temperature measurement device 3 of this embodiment, a predetermined reference value may be set such that the intensity of the light at the 127.5 nm wavelength detected by the photodiode 32b becoming equal to the predetermined reference value, or the difference between the intensity of the light at the 127.5 nm wavelength and the predetermined reference value becoming less than or equal to the predetermined value means that the temperature of the housing 13 has become higher than or equal to the 200° C. reference temperature. Additionally, in the temperature measurement device 3 of this embodiment, the intensity of the light detected by the spectroscopic measurement unit 30 and the reference value set in the memory 36 may be compared and whether or not the light intensity is less than or equal to the reference value may be determined in the alert control unit 38 instead of the computing unit 37. Additionally, in the temperature measurement device 3 of this embodiment, it is possible to omit the aperture plate 32a. In this case, only the photodiode 32b is arranged at the position of the 127.5 nm wavelength.

Third Embodiment

Figure 12:
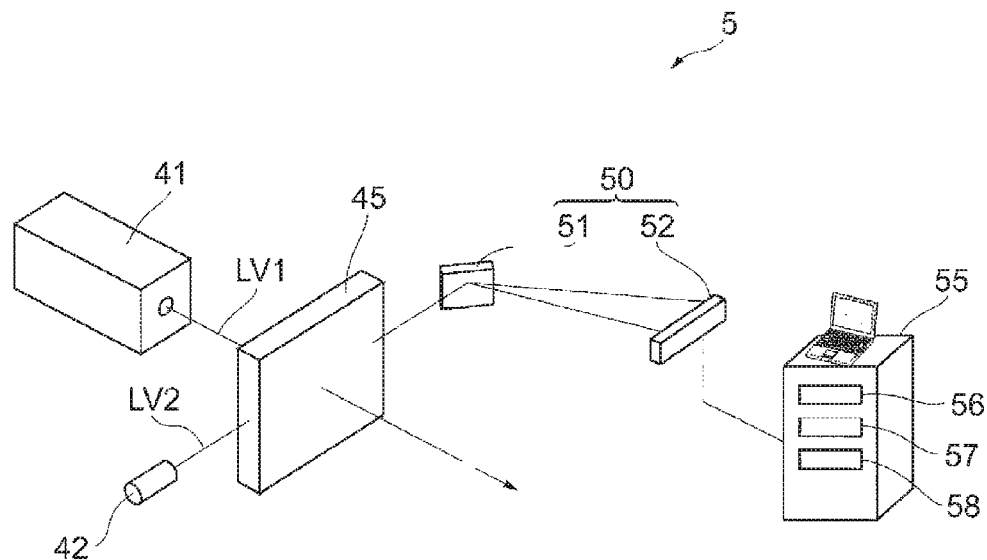
FIG. 12 is a schematic diagram of a temperature measurement device according to a third embodiment.

Next, as a third embodiment exemplifying the present disclosure, FIG. 12 depicts a schematic diagram of a temperature measurement device 5. Hereinafter, the temperature measurement device 5 of the third embodiment will be described while referring to FIG. 12. The temperature measurement device 5 is a temperature measurement device for measuring a temperature of an ultraviolet light transmittance member 45 such as a window, a lens, or optical wavelength conversion element, through which a first ultraviolet light LV1, which has exited from a first light source unit 41, transmits. This temperature measurement device 5 includes a second light source unit 42 for generating a second ultraviolet light LV2 having a spectrum in the vacuum ultraviolet region, a spectroscopic measurement unit 50 for detecting an intensity distribution of the second ultraviolet light LV2 generated by the second light source unit 42 and transmitted through the ultraviolet light transmittance member 45; and a calculation processing unit 55 for obtaining an absorption edge wavelength of the ultraviolet light transmittance member 45 from the intensity distribution of the second ultraviolet light LV2 detected by the spectroscopic measurement unit 50, and deriving a temperature of the ultraviolet light transmittance member 45 on the basis of the obtained absorption edge wavelength.

An example is given where the first light source 41 is an ArF excimer laser or an $F_2$ laser, or an all-solid-state laser device that outputs laser light having the same wavelength as an ArF excimer laser or an $F_2$ laser (e.g. see Japanese Unexamined Patent Application Publication No. 2005-275095, by the applicant of the present application, and the like). Here, the first ultraviolet light LV1 is light having a wavelength of 193 nm or 157 nm, and having high monochromaticity. However, the first ultraviolet light LV1 is not limited to these types of laser light and may be ultraviolet light of a predetermined spectrum width. In this embodiment, description is given for a case in which crystal (crystalline state) is used as the ultraviolet light transmittance member 45 that transmits ultraviolet light of these wavelength bands.

The second ultraviolet light LV2 is light having a spectrum (intensity distribution) in a wavelength region including the absorption edge wavelength of the ultraviolet light transmittance member 45. In cases where the material of the ultraviolet light transmittance member 45 is crystal, the second ultraviolet light LV2 is light having a spectrum in a wavelength region including the absorption edge wavelength of crystal, namely, 145 to 155 nm. Examples of the second light source 42 for generating the second ultraviolet light LV2 include the previously described deuterium lamp 10.

The spectroscopic measurement unit 50 includes a spectral separation member 51 for spectrally separating the second ultraviolet light LV2, and an intensity distribution detector 52 for detecting the intensity distribution of the second ultraviolet light LV2 spectrally-separated by the spectral separation member 51. Examples of the spectral separation member 51 include diffraction gratings and prisms, and examples of the intensity distribution detector 52 include photodiode arrays and photomultipliers. FIG. 12 illustrates a configuration in which a diffraction grating is used as the spectral separation member 51 and a photodiode array is used as the intensity distribution detector 52. Signals of the intensity distribution of the second ultraviolet light LV2 detected by the intensity distribution detector 52 are output from the spectroscopic measurement unit 50 and input into the calculation processing unit 55.

The calculation processing unit 55 includes a memory 56 for storing a preset temperature derivation program, characteristic data pertaining to the ultraviolet light transmittance member 45, and the like; a computing unit 57 for deriving a temperature of the ultraviolet light transmittance member 45 from an intensity distribution of the second ultraviolet light LV2 detected by the spectroscopic measurement unit 50 and the characteristic data stored in the memory 56, on the basis of the temperature derivation program; and an alert control unit 58 for performing alert operations when the temperature of the ultraviolet light transmittance member 45 derived by the computing unit 57 becomes greater than or equal to a preset reference value.

The temperature derivation program and the like for deriving the temperature of the ultraviolet light transmittance member 45 from the characteristic data pertaining to the ultraviolet light transmittance member 45 and the intensity distribution of the second ultraviolet light LV2, is set/stored in advance in the memory 56. The temperature derivation program includes an absorption edge wavelength detection sub-program for obtaining the absorption edge wavelength of the ultraviolet light transmittance member 45 from the intensity distribution of the second ultraviolet light LV2, and a wavelength temperature conversion sub-program for calculating the temperature of the ultraviolet light transmittance member 45 from the obtained absorption edge wavelength. Additionally, examples of the characteristic data pertaining to the ultraviolet light transmittance member 45 include the transmission characteristics of crystal depicted in FIG. 2, the emission spectrum of the second light source unit 42 depicted in FIG. 6, and the like (however, FIG. 6 does not depict the emission spectrum of the second light source unit 42 itself, but rather depicts the emission spectrum of the deuterium lamp 10 including the housing, which has a structure identical to the second light source unit 42).

The method for deriving the temperature of the ultraviolet light transmittance member 45 by the calculation processing unit 55 is the same as the method for deriving the temperature of the housing 13 by the calculation processing unit 25 of the first embodiment described above (Working Examples 1 to 3). As such, a simple description is given here of a case in which the method for deriving the temperature of Working Example 1 is applied as the method for deriving the temperature of the ultraviolet light transmittance member 45 by the calculation processing unit 55.

Figure 13:
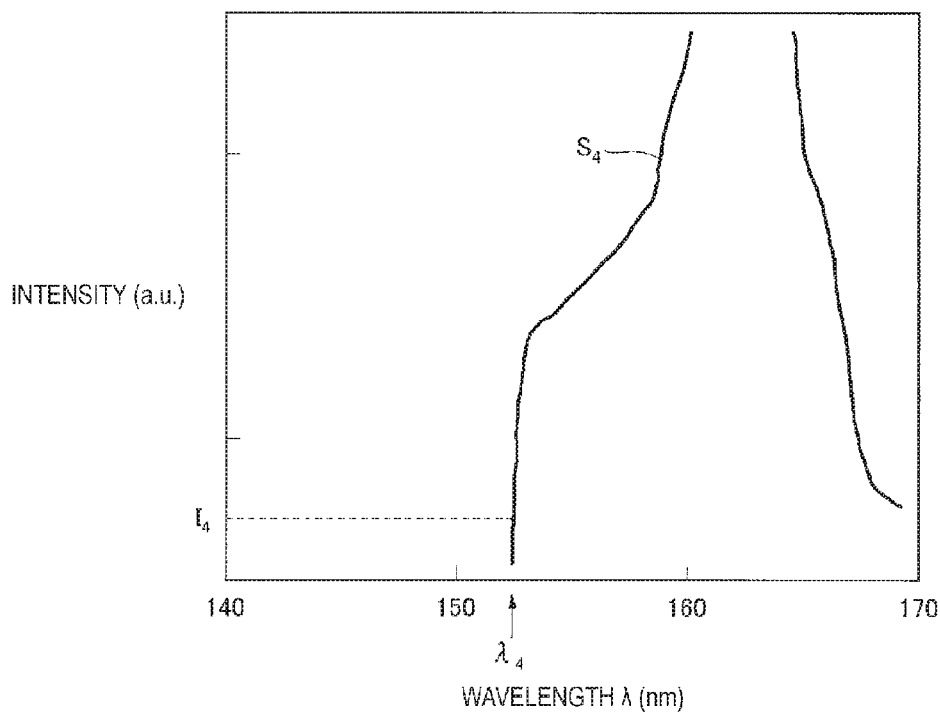
FIG. 13 is an explanatory diagram for supplementary explanation of the method for detecting the absorption edge wavelength (Working Example 1).

In this method for deriving the temperature, a wavelength where the intensity becomes less than or equal to a predetermined reference value in the intensity distribution of the second ultraviolet light LV2 detected by the spectroscopic measurement unit 50 is defined as the absorption edge wavelength of the ultraviolet light transmittance member 45. In the graph depicted in FIG. 13, the wavelength of the light included in the second ultraviolet light LV2 is shown on the horizontal axis and the intensity is shown on the vertical axis. An example of the intensity distribution of the second ultraviolet light LV2 detected by the intensity distribution detector 52 is plotted on the graph. The intensity $I_4$ indicated by the dashed line is set/stored in the memory 56 as the reference value; the computing unit 57 detects a wavelength $\lambda_4$ where the intensity becomes less than or equal to the reference value $I_4$, from the data of the intensity distribution $S_4$ of the second ultraviolet light LV2 output from the intensity distribution detector 52; and this $\lambda_4$ is defined as the absorption edge wavelength of the ultraviolet light transmittance member 45.

Then, the calculation processing unit 55 derives the temperature of the ultraviolet light transmittance member 45 on the basis of the characteristics formula of the ultraviolet light transmittance member 45 set/stored in advance and the detected absorption edge wavelength $\lambda_4$. Specifically, the calculation processing unit 55 reads out the characteristics formula of crystal (see FIG. 10 for an example) stored in the memory 56 to the computing unit 57, and the temperature of the ultraviolet light transmittance member 45 is derived by substituting the absorption edge wavelength $\lambda_4$ into the read-out characteristics formula. For example, if $\lambda_4$ is 153 nm, the temperature of the ultraviolet light transmittance member 45 calculated from the characteristics formula of crystal is 300° C. Then, the calculation processing unit 55 outputs the calculated temperature of the ultraviolet light transmittance member 45 to an operating panel or external personal computer (not illustrated in the drawings) via an I/O circuit, and displays the temperature as "ultraviolet light transmittance member temperature".

Additionally, when the calculated temperature of the ultraviolet light transmittance member 45 is greater than or equal to a predetermined reference value set/stored in the memory 56 in advance, the calculation processing unit 55 performs predetermined alert operations. The reference value set/stored in the memory 56 is set basically in accordance with the material, shape, dimensions, and the like of the ultraviolet light transmittance member 45, and the wavelength of the first ultraviolet light LV1 that transmits through the ultraviolet light transmittance member 45. For example, in cases where the material of the ultraviolet light transmittance member 45 is crystal as in this embodiment, structural change occurs in crystal at around 450° C., and the physical and mechanical characteristics thereof change. Accordingly, in cases where the wavelength of the first ultraviolet light LV1 is afforded a margin with respect to the absorption edge wavelength of the ultraviolet light transmittance member 45, specifically, for example, in cases where the wavelength of the first ultraviolet light LV1 is 193 nm and differs greatly from the absorption edge wavelength when the temperature of the ultraviolet light transmittance member 45 is 450° C. (about 157 nm in FIG. 10), the reference temperature for alarm occurrence is set on the basis of this temperature (450° C.). The reference temperature for alert operations here is set to a temperature of about 380 to 420° C. (e.g. 400° C.), and is set/stored in the memory 56.

On the other hand, in cases where the wavelength of the first ultraviolet light LV1 is close to the absorption edge wavelength of the ultraviolet light transmittance member 45, the wavelength difference (margin) must be taken into consideration. For example, in cases such as where the wavelength of the first ultraviolet light LV1 is 157 nm, if the reference temperature for alert operations is set to 400° C. as above, the absorption edge wavelength of the ultraviolet light transmittance member 45 at the reference temperature will be 156 nm. As a result, the wavelength difference between the absorption edge wavelength of the ultraviolet light transmittance member 45 and the wavelength of the first ultraviolet light LV1, namely 157 nm, will be about 1 nm. In this case, due to the fact that the absorption edge wavelength of the ultraviolet light transmittance member 45 will shift to 157 nm with only a slight increase in temperature, there is a possibility that damage will occur in the ultraviolet light transmittance member 45 due to thermal runaway caused by rapid increases in the absorptivity of the first ultraviolet light LV1. Accordingly, in such cases, a wavelength difference of a set magnitude is provided between the wavelength of the first ultraviolet light LV1 and the absorption edge wavelength of the ultraviolet light transmittance member 45 at the reference temperature, and the reference temperature for the alert operations is set to a temperature of about 300 to 340° C. (e.g. 320° C.). Here, as depicted in FIG. 10, the absorption edge wavelength of the ultraviolet light transmittance member 45 at 320° C. is about 153 nm.

The calculation processing unit 55 causes an alert control unit 58 to perform alert operations when the temperature of the ultraviolet light transmittance member 45 calculated by the computing unit 57 becomes greater than or equal to the reference temperature set/stored in the memory 56. Specific details of the alert operations are as described above. Specifically, for example, the calculation processing unit 55 outputs an alert signal to an operation panel, external personal computer, or the like (not illustrated in the drawings) via an I/O circuit, and causes a message such as, "ultraviolet light transmittance member has reached reference temperature" to be displayed, or a visual alert by means of a rotating lamp or the like or audio alert by means of beeping sounds or the like to be performed.

Accordingly, with the temperature measurement device 5, the temperature of the ultraviolet light transmittance member 45 can be accurately measured with a concise configuration. Additionally, countermeasures are taken such as reducing the output of the first light source 41 on the basis of the alert operations by the alert control unit 58 and, as a result, the occurrence of problems caused by temperature increases of the ultraviolet light transmittance member 45 can be prevented.

As described above, in the temperature measurement method of aspects of the present disclosure, the temperature measurement devices 2, 3, and 5 and the light source devices LS1 and LS2 detect the ultraviolet light transmitted through the ultraviolet light transmittance member using the spectroscopic measurement unit, obtain the absorption edge wavelength of the ultraviolet light transmittance member, and derive the temperature of the ultraviolet light transmittance member on the basis of the obtained absorption edge wavelength. As a result, the temperature of the ultraviolet light transmittance member can be accurately measured by concise means and with a concise configuration.

Note that in the embodiments, a deuterium lamp has been described as an example of a light source for generating ultraviolet light in the vacuum ultraviolet region, but any light source may be used provided that it has an emission spectrum in the vacuum ultraviolet region. Examples thereof include excimer lamps and the like. Additionally, calcium fluoride ($CaF_2$), crystal, and quartz glass ($SiO_2$) have been described as examples of the material of the ultraviolet light transmittance member through which ultraviolet light in the vacuum ultraviolet region transmits, but the present disclosure is not limited to these materials. The present disclosure may be applied likewise to other known materials that transmit ultraviolet light in the vacuum ultraviolet region such as magnesium fluoride ($MgF_2$), lithium fluoride (LiF), sapphire glass, and the same beneficial effects can be obtained.

Note that in the embodiments, the following methods for determining the absorption edge wavelength have been described, but the method for determining the absorption edge wavelength is not limited thereto:

Method in which the wavelength in the spectral intensity distribution where the intensity of the transmitted light becomes less than or equal to a reference value is determined to be the absorption edge wavelength (Working Example 1)

Method in which the wavelength in the spectral intensity distribution where $dI/d\lambda$, becomes greater than or equal to a reference value is determined to be the absorption edge wavelength (Working Example 2)

Method in which the wavelength where the difference between the spectral intensity distribution of the ultraviolet light near the light source portion and the spectral intensity distribution of the ultraviolet light after having transmitted through the ultraviolet light transmittance member becomes less than or equal to a reference value, equal to the reference value, or greater than or equal to the reference value is determined to be the absorption edge wavelength (Working Example 3). For example, the wavelength where the intensity in the spectral intensity distribution of the transmitted light becomes equal to the reference values or the wavelength where the difference between the intensity of the transmitted light and the reference value becomes less than or equal to a predetermined value may be determined as the absorption edge wavelength; or the wavelength where $dI/d\lambda$, becomes equal to a reference value, or the wavelength where the difference between $dI/d\lambda$, and the reference value becomes less than or equal to a predetermined value may be determined as the absorption edge wavelength. In other words, the absorption edge wavelength may be any wavelength provided that it is determined on the basis of a predetermined reference value from among the wavelengths in the wavelength region where the intensity present on the short wavelength side of the spectral intensity distribution rapidly declines. Accordingly, Working Examples 1 to 3 described above are no more than examples of numerous standards that can be utilized to determine the absorption edge wavelength.

Note that in the first and third embodiments, the calculation processing units 25 and 55 cause the alert control units 28 and 58 to perform the alert operations when the temperature of the housing 13 and the ultraviolet light transmittance member 45 become higher than or equal to the reference temperature, but the present disclosure is not limited to this configuration. Provided that the alert operations are performed on the basis of a comparison of the temperature of the housing 13 or the ultraviolet light transmittance member 45 and the reference temperature, the calculation processing units 25 and 55 may be configured to cause the alert control units 28 and 58 to perform the alert operations when the temperature of the housing 13 or the ultraviolet light transmittance member 45 becomes equal to the reference temperature or becomes close to the reference temperature.

In the temperature measurement method of the above embodiment, ultraviolet light transmitted through the ultraviolet light transmittance member is detected using the spectroscopic measurement unit, and the absorption edge wavelength is obtained; and the temperature of the ultraviolet light transmittance member is derived on the basis of the obtained absorption edge wavelength. As a result, the temperature of the ultraviolet light transmittance member can be accurately measured by concise means.

The temperature measurement device of the above embodiment includes the spectroscopic measurement unit which detects the intensity distribution of the ultraviolet light transmitted through the ultraviolet light transmittance member; and the calculation processing unit which obtains the absorption edge wavelength of the ultraviolet light transmittance member from the intensity distribution of the ultraviolet light, and which derives the temperature of the ultraviolet light transmittance member on the basis of the obtained absorption edge wavelength. As a result, a temperature measurement device, by which the temperature of the ultraviolet light transmittance member can be accurately measured, can be provided with a concise configuration.

The light source device of the above embodiment includes the light source unit which generates ultraviolet light; the ultraviolet light transmittance member that transmits ultraviolet light generated by the light source unit; and the temperature measurement device for the ultraviolet light transmittance member of the second aspect. The temperature measurement device includes the alert control unit which performs alert operations (operations for alerting a user or the like of danger, operations for preventing a device from reaching a state of danger, operations for extricating a device from a state of danger, and the like) when the derived temperature of the ultraviolet light transmittance member becomes greater than or equal to a preset reference value. As a result, a light source device, by which the occurrence of problems caused by temperature increases of the ultraviolet light transmittance member can be prevented, can be provided with a concise device configuration.

The light source device of the above embodiment includes the light source unit for generating ultraviolet light; the ultraviolet light transmittance member that transmits the ultraviolet light generated by the light source unit; the spectroscopic measurement unit for detecting the intensity of light which is included in the ultraviolet light and which has the absorption edge wavelength of the ultraviolet light transmittance member, the absorption edge wavelength being an absorption edge wavelength in a case that the ultraviolet light transmittance member through which the ultraviolet light has passed becomes equal to the reference temperature; and the alarm control unit which performs alarm operations when the intensity of the light detected by the spectroscopic measurement unit becomes less than or equal to the preset reference value. As a result, a light source device, by which the occurrence of problems caused by temperature increases of an ultraviolet light transmittance member can be prevented, can be provided with a concise and inexpensive device configuration.

The temperature measurement device of the above embodiment is a temperature measurement device for measuring the temperature of an ultraviolet light transmittance member transmitting a first ultraviolet light. The temperature measurement device includes the light source unit which generates the second ultraviolet light (e.g. a second light source unit 42 in the embodiments), the spectroscopic measurement unit which detects the intensity distribution of the wavelength region including the absorption edge wavelength of the ultraviolet light transmittance member, in the second ultraviolet light generated by the light source unit and transmitted through the ultraviolet light transmittance member; and the calculation processing unit which obtains the absorption edge wavelength of the ultraviolet light transmittance member from the intensity distribution of the second ultraviolet light detected by the spectroscopic measurement unit, and which derives the temperature of the ultraviolet light transmittance member on the basis of the obtained absorption edge wavelength. As a result, a temperature measurement device, by which the temperature of the ultraviolet light transmittance member can be accurately measured, can be provided with a concise configuration.

The invention claimed is:

1. A temperature measurement method for measuring a temperature of an ultraviolet light transmittance member transmitting ultraviolet light, the method comprising:
    detecting ultraviolet light transmitted through the ultraviolet light transmittance member using a spectroscopic measurement unit, and obtaining an absorption edge wavelength of the ultraviolet light transmittance member; and
    deriving a temperature of the ultraviolet light transmittance member on the basis of the obtained absorption edge wavelength.

2. A temperature measurement device for an ultraviolet light transmittance member, the device being configured to measure a temperature of the ultraviolet light transmittance member transmitting ultraviolet light, the device comprising:
    a spectroscopic measurement unit which detects an intensity distribution of a wavelength region including an absorption edge wavelength of the ultraviolet light transmittance member, in ultraviolet light transmitted through the ultraviolet light transmittance member; and
    a calculation processing unit which obtains the absorption edge wavelength of the ultraviolet light transmittance member from the intensity distribution of the ultraviolet light detected by the spectroscopic measurement unit, and which derives a temperature of the ultraviolet light transmittance member on the basis of the obtained absorption edge wavelength.

3. The temperature measurement device for the ultraviolet light transmittance member according to claim 2, wherein the calculation processing unit determines a wavelength where an intensity in the intensity distribution of the ultraviolet light detected by the spectroscopic measurement unit becomes less than or equal to a preset reference value to be the absorption edge wavelength.

4. The temperature measurement device for the ultraviolet light transmittance member according to claim 2, wherein the calculation processing unit determines a wavelength where $dI/d\lambda$, in the intensity distribution of the ultraviolet light detected by the spectroscopic measurement unit becomes greater than or equal to a preset reference value to be the absorption edge wavelength, where $\lambda$ is the wavelength of the ultraviolet light and I is an intensity of the ultraviolet light.

5. The temperature measurement device for the ultraviolet light transmittance member according to claim 2, wherein the calculation processing unit compares an intensity distribution of ultraviolet light prior to transmitting through the ultraviolet light transmittance member stored in advance to the intensity distribution of the ultraviolet light detected by the spectroscopic measurement unit to obtain a difference and determines a wavelength where the difference is greater than or equal to a preset reference value, equal to the reference value, or less than or equal to the reference value to be the absorption edge wavelength.

6. A light source device comprising:
    a light source unit which generates ultraviolet light;
    an ultraviolet light transmittance member that transmits the ultraviolet light generated by the light source unit; and
    the temperature measurement device for the ultraviolet light transmittance member according to claim 2;
    the temperature measurement device comprising an alert control unit which performs alert operations in a case that a derived temperature of the ultraviolet light transmittance member becomes greater than or equal to a preset reference value.

7. A light source device comprising:
    a light source unit which generates ultraviolet light;
    an ultraviolet light transmittance member that transmits the ultraviolet light generated by the light source unit;
    a spectroscopic measurement unit which detects an intensity of light which is included in the ultraviolet light and which has an absorption edge wavelength of the ultraviolet light transmittance member, the absorption edge wavelength being an absorption edge wavelength in a case that the ultraviolet light transmittance member through which the ultraviolet light has passed becomes equal to a reference temperature; and
    an alarm control unit which performs alarm operations in a case that the intensity of the light detected by the spectroscopic measurement unit becomes less than or equal to a preset reference value.

8. The light source device according to claim 6, wherein:
    a material of the ultraviolet light transmittance member is calcium fluoride; and
    a temperature of the preset reference value or the reference temperature is from 190 to 210° C.

9. The light source device according to claim 6, wherein the alert control unit performs alert operations to reduce an emission intensity of the ultraviolet light generated by the light source unit.

10. The light source device according to claim 6, further comprising a cooling structure which cools the ultraviolet light transmittance member, wherein
    the alert control unit performs alert operations to strengthen cooling of the ultraviolet light transmittance member by increasing cooling capacity of the cooling structure.

11. A temperature measurement device for an ultraviolet light transmittance member, the device being configured to measure a temperature of the ultraviolet light transmittance member transmitting a first ultraviolet light, the device comprising:
    a light source unit which generates a second ultraviolet light;
    a spectroscopic measurement unit which detects an intensity distribution of a wavelength region including an absorption edge wavelength of the ultraviolet light transmittance member, in the second ultraviolet light generated by the light source unit and transmitted through the ultraviolet light transmittance member; and
    a calculation processing unit which obtains the absorption edge wavelength of the ultraviolet light transmittance member from the intensity distribution of the second ultraviolet light detected by the spectroscopic measurement unit, and which derives a temperature of the ultraviolet light transmittance member on the basis of the obtained absorption edge wavelength.

12. The temperature measurement device for the ultraviolet light transmittance member according to claim 11, wherein the calculation processing unit determines a wavelength where an intensity in the intensity distribution of the second ultraviolet light detected by the spectroscopic measurement unit becomes less than or equal to a preset reference value to be the absorption edge wavelength.

13. The temperature measurement device for the ultraviolet light transmittance member according to claim 11, wherein the calculation processing unit determines a wavelength where $dI/d\lambda$, in the intensity distribution of the second ultraviolet light detected by the spectroscopic measurement unit becomes greater than or equal to a preset reference value to be the absorption edge wavelength, where $\lambda$ is the wavelength of the ultraviolet light and I is an intensity of the ultraviolet light.

14. The temperature measurement device for the ultraviolet light transmittance member according to claim 11, wherein the calculation processing unit compares an intensity distribution of the second ultraviolet light prior to transmitting through the ultraviolet light transmittance member stored in advance to the intensity distribution of the second ultraviolet light detected by the spectroscopic measurement unit to obtain a difference and determines a wavelength where the difference is greater than or equal to a preset reference value, equal to the reference value, or less than or equal to the reference value to be the absorption edge wavelength.

\* \* \* \* \*

UNITED STATES PATENT AND TRADEMARK OFFICE
CERTIFICATE OF CORRECTION

PATENT NO. : 9,671,290 B2
APPLICATION NO. : 15/191871
DATED : June 6, 2017
INVENTOR(S) : Masafumi Mizuguchi Page 1 of 1

It is certified that error appears in the above-identified patent and that said Letters Patent is hereby corrected as shown below:

In the Claims

Column 19, Line 53:
In Claim 4, delete "dI/dλ," and insert -- dI/dλ --, therefore.

Column 21, Line 11:
In Claim 13, delete "dI/dλ," and insert -- dI/dλ --, therefore.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*